(12) United States Patent
Kim et al.

(10) Patent No.: US 7,929,104 B2
(45) Date of Patent: Apr. 19, 2011

(54) LIQUID CRYSTAL DISPLAY AND METHOD OF PRODUCING SAME

(75) Inventors: Gwan-soo Kim, Seoul (KR); Byoung-joo Kim, Anyang-si (KR); Chul Huh, Suwon-si (KR); Sang-hun Lee, Suwon-si (KR); Min Kang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 859 days.

(21) Appl. No.: 11/867,930

(22) Filed: Oct. 5, 2007

(65) Prior Publication Data

US 2009/0027607 A1 Jan. 29, 2009

(30) Foreign Application Priority Data

Oct. 18, 2006 (KR) .................. 10-2006-0101435

(51) Int. Cl.
  *G02F 1/1339* (2006.01)
  *G02F 1/1333* (2006.01)
  *H01L 21/00* (2006.01)

(52) U.S. Cl. ........... 349/155; 349/106; 349/187; 438/30

(58) Field of Classification Search .................... 349/42, 349/43, 104, 106, 107, 108, 122, 138, 110, 349/155, 156, 158, 187, 191; 438/30, 29
See application file for complete search history.

(56) References Cited

U.S. PATENT DOCUMENTS

| | | | |
|---|---|---|---|
| 6,433,852 B1 * | 8/2002 | Sonoda et al. | 349/156 |
| 6,437,847 B1 * | 8/2002 | Kishimoto | 349/155 |
| 6,897,918 B1 * | 5/2005 | Nonaka et al. | 349/106 |
| 6,989,883 B2 * | 1/2006 | Park et al. | 349/155 |
| 7,248,329 B2 * | 7/2007 | Park et al. | 349/155 |
| 2004/0252271 A1 * | 12/2004 | Song | 349/155 |
| 2008/0239214 A1 * | 10/2008 | Lee et al. | 349/106 |
| 2009/0027607 A1 * | 1/2009 | Kim et al. | 349/155 |

* cited by examiner

*Primary Examiner* — Brian M Healy
(74) *Attorney, Agent, or Firm* — F. Chau & Associates, LLC (57) ABSTRACT

A method of producing a liquid crystal display includes forming a plurality of black matrices on an insulating substrate to define first, second and third pixel regions, forming a color filter layer on the black matrices and on an exposed portion of the insulating substrate on which the black matrices are not formed, forming an organic layer for forming an upper spacer on the color filter layer, and forming a first color filter pattern on a first pixel region, lower spacers on the black matrices, and upper spacers on the lower spacers by at least substantially simultaneously patterning the color filter layer and the organic layer for forming an upper spacer.

18 Claims, 8 Drawing Sheets

LIQUID CRYSTAL DISPLAY AND METHOD OF PRODUCING SAME

CROSS-REFERENCE TO RELATED PATENT APPLICATION

This application claims priority to Korean Patent Application No. 10-2006-0101435, filed on Oct. 18, 2006, the disclosure of which is herein incorporated by reference in its entirety.

BACKGROUND OF THE INVENTION

1. Technical Field

The present disclosure relates to a liquid crystal display and a method of producing the same. More particularly, the present disclosure relates to a method of producing a liquid crystal display in which the number of process devices and a process time may be reduced, and a liquid crystal display produced using the method.

2. Discussion of Related Art

A liquid crystal display (LCD) is one of the most widely used flat panel displays. An LCD may include two substrates on which electrodes are formed and a liquid crystal layer interposed between the substrates. When a voltage is applied to the electrodes, the liquid crystal molecules of the liquid crystal layer change their alignment based on the resulting electric field, affecting polarization and controlling the quantity of transmitted light.

The production of LCD panels can be a complicated process. In particular a substrate of the LCD may be produced through a multi-step process that includes forming a conductive layer, a color filter layer and an organic material layer on the substrate, and patterning the conductive layer, the color filter layer, and the organic material layer to form electrodes, color filter patterns, and the spacers.

However, when a liquid crystal display is produced through a multi-step process, the process time and the number of process devices required may depend on the number of process steps and may affect production cost.

There is a need for a method of producing LCDs to reduce the production time, cost and complexity.

SUMMARY OF THE INVENTION

According to an exemplary embodiment of the present invention, a method of producing a liquid crystal display includes forming a plurality of black matrices on an insulating substrate to define first, second and third pixel regions, forming a color filter layer on the black matrices and on an exposed portion of the insulating substrate on which the black matrices are not formed, forming an organic layer for forming upper spacers on the color filter layer, and forming a first color filter pattern on a first pixel region, lower spacers on the black matrices, and upper spacers on the lower spacers by at least substantially simultaneously patterning the color filter layer and the organic layer for forming an upper spacer.

According to exemplary embodiment of the present invention, a liquid crystal display includes an insulating substrate, black matrices formed on the insulating substrate to define first, second, and third pixel regions, first, second, and third color filter patterns formed on the first, the second, and the third pixel regions, respectively, and spacers provided on the black matrices. The spacers include a lower spacer made of substantially the same substance as a first color filter pattern and an upper spacer formed directly on the lower spacer.

BRIEF DESCRIPTION OF THE DRAWINGS

The present invention will become readily apparent to those of ordinary skill in the art when descriptions of exemplary embodiments thereof are read with reference to the accompanying drawings.

DESCRIPTION OF EXEMPLARY EMBODIMENTS

Hereinafter, exemplary embodiments of the present invention will be described in detail with reference to the accompanying drawings. Like reference numerals may refer to similar or identical elements throughout the description of the figures.

Figure 1:
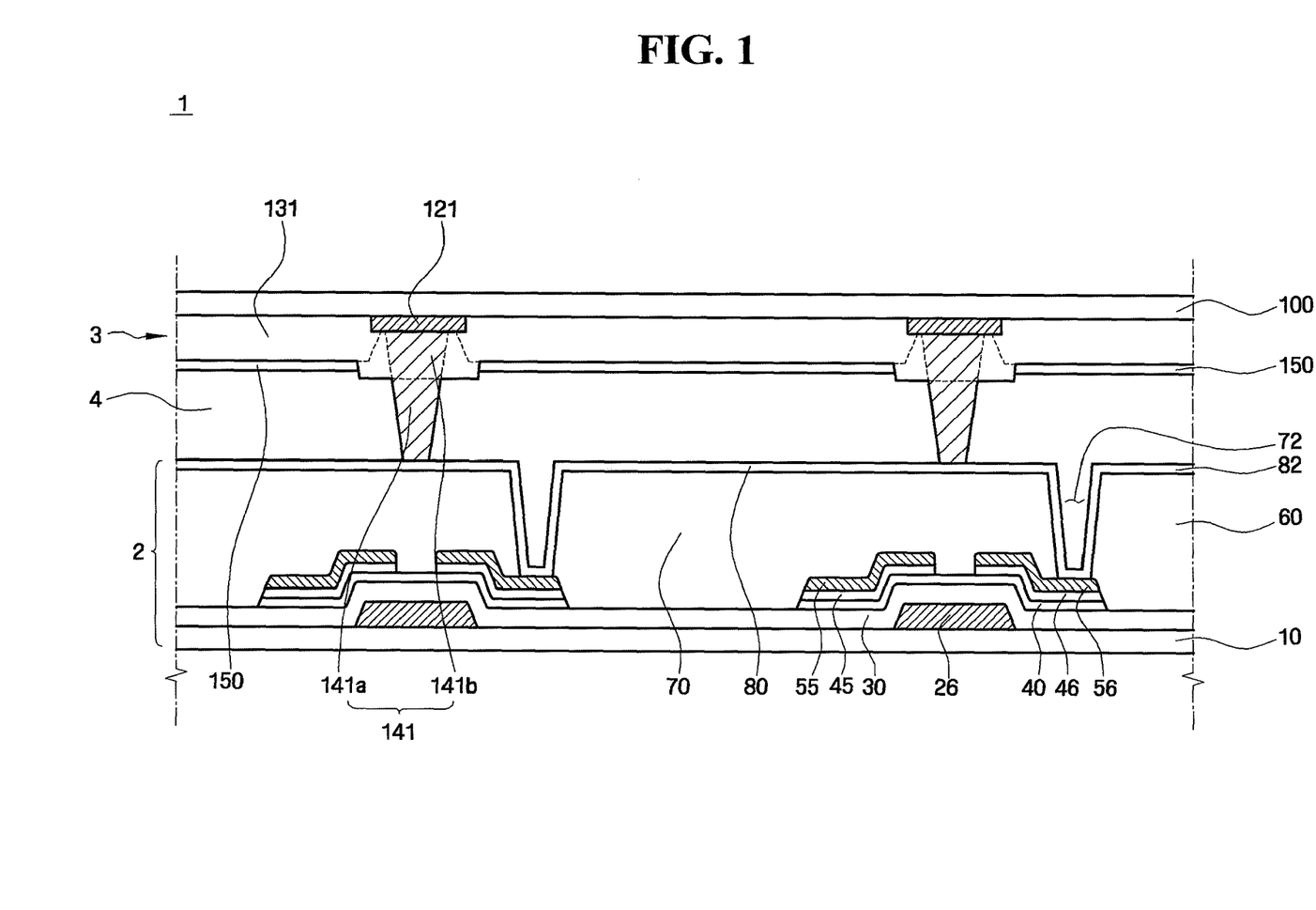
FIG. 1 is a sectional view of a portion of a liquid crystal display according to an exemplary embodiment of the present invention.
Figure 2:
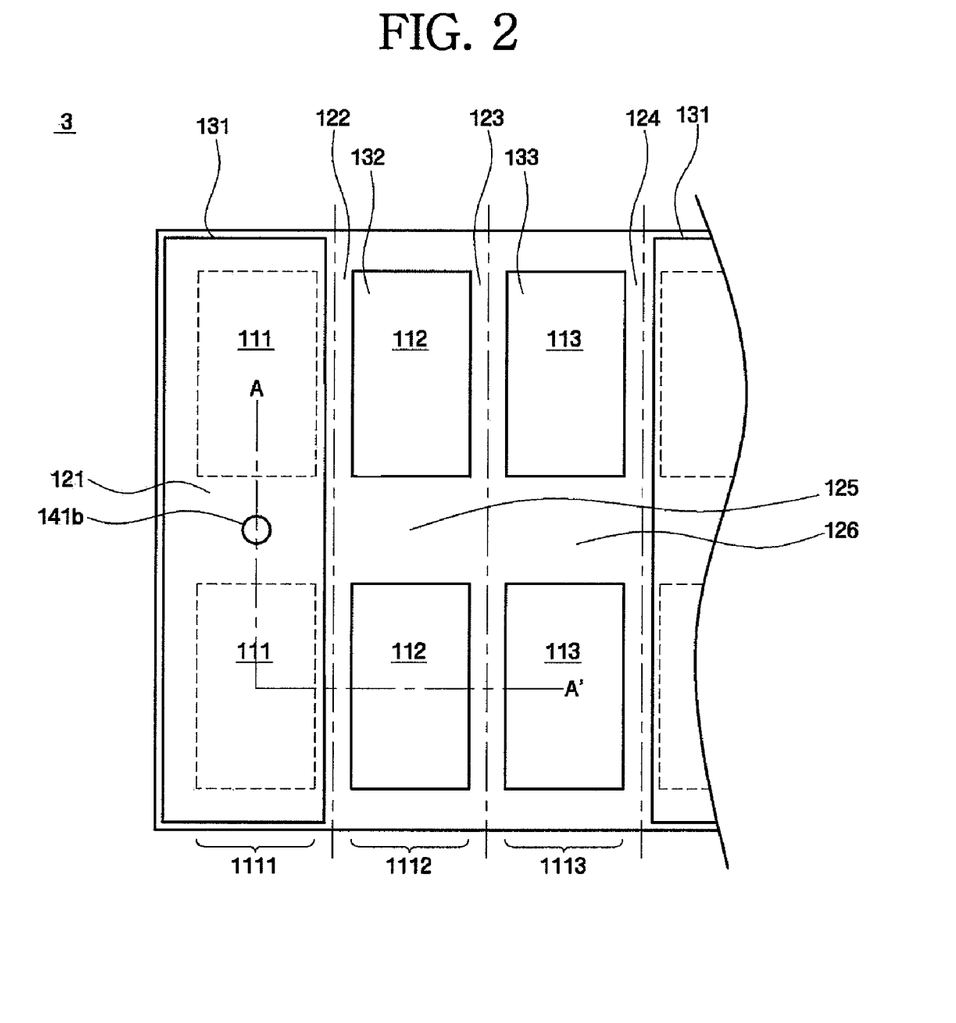
FIG. 2 is a plan view of a portion of a substrate of a liquid crystal display according to an exemplary embodiment of the present invention.
Figure 3:
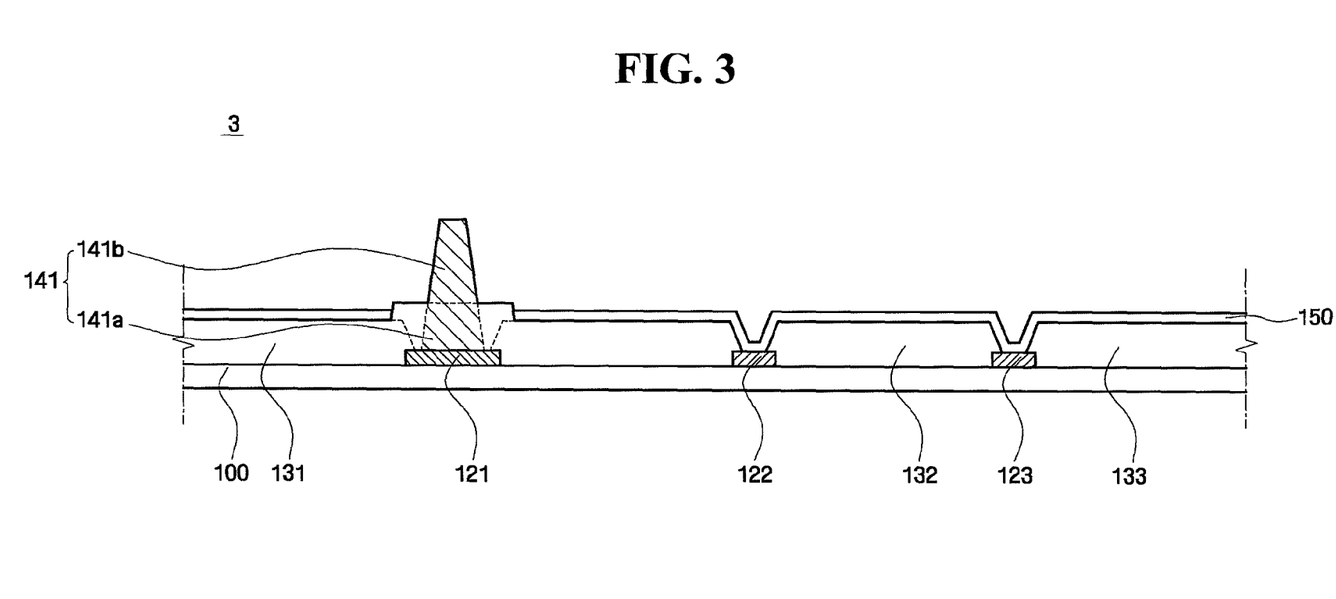
FIG. 3 is a sectional view of the substrate of FIG. 2 taken along the line A-A' in FIG. 2.

A liquid crystal display according to an exemplary embodiment of the present invention will be described with reference to FIGS. 1 through 3. FIG. 1 is a sectional view of a portion of a liquid crystal display according to an exemplary embodiment of the present invention. FIG. 2 is a plan view of a portion of a substrate of a liquid crystal display according to an exemplary embodiment of the present invention. FIG. 3 is a sectional view of the substrate of FIG. 2 taken along the line A-A' in FIG. 2.

Referring to FIG. 1, a liquid crystal display 1 includes a first substrate 2 on which a thin film transistor is formed, a second substrate 3 including first, second, and third color filter patterns 131, 132, and 133 formed thereon and which faces the first substrate 2, and a liquid crystal layer 4 interposed between the first substrate 2 and the second substrate 3. A backlight (not shown) as a light source may be provided under the second substrate 3.

The first substrate 2 of the liquid crystal display 1 includes a gate electrode 26, a data line (not shown), a source electrode 55, a drain electrode 56, and a pixel electrode 82 that are formed on a transparent substrate 10.

The transparent substrate 10 may comprise a substance having a heat resistance property and a light transmission property, such as for example, a glass material or transparent plastics.

The gate electrode 26 is formed on the transparent substrate 10. The gate electrode 26 may extend in a transverse direction. The gate electrode 26 may be formed in a gate line (not shown) for transmitting a gate signal. A portion of the gate line may have a larger width in comparison with other portions of the gate line to provide a gate electrode 26.

The gate electrode 26 and the gate line may comprise an aluminum-based metal, such as aluminum (Al) and/or an aluminum alloy, a silver-based metal, such as silver (Ag) and/or a silver alloy, a copper-based metal, such as copper (Cu) and/or a copper alloy, a molybdenum-based metal, such as molybdenum (Mo) and/or a molybdenum alloy, chromium (Cr), titanium (Ti), and/or tantalum (Ta). The gate electrode 26 and the gate line may be formed as a single layer or as a multilayered structure (not shown) including, for example, two conductive layers, which may have different physical properties.

The gate electrode 26 comprises one of the three terminals of the thin film transistor in conjunction with the source electrode 55 and the drain electrode 56.

A storage electrode (not shown) is formed on the same layer as the gate line to overlap the pixel electrode 82, thus forming a storage capacitor.

A gate insulating layer 30 that may comprise an inorganic insulating substance, such as for example, silicon oxide (SiOx) or silicon nitride (SiNx), or an organic insulating substance such as BCB (BenzoCycloButene), an acryl-based substance, or a polyimide covers the gate electrode 26 and the gate line on the transparent substrate 10.

An active layer 40 that may comprise hydrogenated amorphous silicon, polysilicon, or a conductive organic substance is formed on a portion of the gate insulating layer 30.

For example, the active layer 40 may be formed to have an island shape. The active layer 40 overlaps the gate electrode 26 and partially overlaps the source electrode 55 and the drain electrode 56. It is to be understood that the active layer 40 may have various types of shapes.

Ohmic contact layers 45 and 46 may be formed on the active layer 40. Ohmic contact layers 45 and 46 may comprise silicide, n+ hydrogenated amorphous silicon in which an n-type impurity is doped in a high concentration, or ITO in which a p-type impurity is doped.

In an exemplary embodiment of the present invention, data interconnections that are formed on the active layer 40 and the gate insulating film 30 include a data line (not shown) that extends in a longitudinal direction, which is insulated from the gate line and crosses the gate line to define a pixel, the source electrode 55 that is branched from the data line and extends to an upper part of the active layer 40, the drain electrode 56 that is separated from the source electrode 55 and faces the source electrode 55, and the gate electrode 26 that is provided between the source electrode 55 and the drain electrode 56.

A data signal that is applied from an external circuit to the data line is transferred through the data line to the source electrode 55.

After the turn-on voltage is applied to the gate electrode 26 of the thin film transistor, a data voltage for displaying an image signal is applied to the data line to drive the liquid crystal display 1. The data voltage is transmitted through the source electrode 55 and the drain electrode 56 to the pixel electrode 82. When the data voltage is applied through the pixel electrode 82 to a liquid crystal capacitor and a storage capacitor, an electric field is formed due to a potential difference between the pixel electrode 82 and a common electrode 150.

Data interconnections, for example, formed on the active layer 40 and the gate insulating film 30, may comprise a refractory metal such as chromium, molybdenum-based metal, tantalum, and/or titanium. The data interconnections may have a multilayered structure that includes, for example, a lower refractory metal layer (not shown) and an upper layer (not shown) that includes a substance having low resistance to current flow.

A passivation layer 60 is formed on the data interconnections and the portions of the active layer 40 that are exposed between the data interconnections.

The passivation layer 60 may be formed of an inorganic substance that contains silicon nitride (SiNx) or silicon oxide, a a-Si:C:O layer or a a-Si:O:F layer (low dielectric CVD layer), for example, deposited using a plasma enhanced chemical vapor deposition (PECVD) process, or an acryl-based organic insulating substance having excellent planarization property and photosensitivity.

A contact hole 72 is formed in the passivation layer 60 to expose the drain electrode 56 therethrough. The contact hole 72 may be formed to have various shapes such as a polygon or a circle and may have an enlarged width for connection to the pixel electrode 82.

The pixel electrode 82, which is electrically connected through the contact hole 72 to the source electrode 55, is provided in a display region formed on the passivation layer 60. The pixel electrode 82 may comprise a transparent conductor, such as ITO (Indium Tin Oxide) or IZO (Indium Zinc Oxide), or a reflective conductor such as aluminum.

Hereinafter, a second substrate 3 of the liquid crystal display 1 according to an exemplary embodiment of the present invention will be described with reference to FIGS. 2 and 3.

The second substrate 3 includes an insulating substrate 100, a plurality of black matrices 121, 122, 123, 124, 125 and 126 that is formed on the insulating substrate 100, first, second and third color filter patterns 131, 132 and 133, spacers 141 that are formed on the black matrices 121, 122, 123, 124, 125 and 126, and a common electrode 150.

The insulating substrate 100 of the second substrate 3 may comprise a substance having a heat resistance property and a light transmission property, for example, a glass material or transparent plastics. The insulating substrate 100 may comprise the same material as the transparent substrate 10 of FIG. 1.

The black matrices 121, 122, 123, 124, 125 and 126 are formed on the insulating substrate 100 to define the first, second and third pixel regions 1111, 1112 and 1113 shown in FIG. 2.

The black matrices 121, 122, 123, 124, 125 and 126 may comprise an opaque substance, for example, chromium (Cr), and may prevent leakage of light to improve the quality of images. The black matrices 121, 122, 123, 124, 125 and 126 may be formed to overlap the gate and/or the data interconnections of the first substrate, for example, to maximize an opening ratio.

The first, second and third pixel regions 1111, 1112 and 1113, which are defined by the black matrices 121, 122, 123, 124, 125 and 126, include a plurality of pixels 111, 112 and 113, which may be disposed in a stripe, mosaic or delta shape. In exemplary embodiments of the present invention described in connection with FIGS. 1, 2, 3, 4, 5 and 6A through 6E, a plurality of pixels 111, 112 and 113 are disposed in a stripe shape. Hereinafter, the first, second and third pixel regions 1111, 1112 and 1113 that include the pixels 111, 112 and 113 disposed in the stripe shape may be referred to as 'a column of pixels'.

The first, second and third color filter patterns 131, 132 and 133 are formed in the first, second and third pixel regions 1111, 1112 and 1113, respectively. The first, second, and third color filter patterns 131, 132 and 133 may comprise a substance through which light rays of different colors pass, and only light having a predetermined wavelength is transmitted through the first, second, and third color filter patterns 131, 132 and 133. The first color filter pattern 131 is formed on the first pixel region 1111 and the black matrices 121, 122 and 124 surrounding the first pixel region 1111. The first color filter pattern 131 may be formed to cover the whole first pixel region 1111. The second and the third color filter patterns 132 and 133 may be disposed in the second pixel 112 and the third pixel 113 of the second and third pixel regions 1112 and 1113, respectively. However, although not shown as such in FIG. 2, the second and the third color filter patterns may be formed to cover the whole second and third pixel regions 1112 and 1113.

The first, second, and third color filter patterns 131, 132 and 133 may comprise a red organic substance through which light having a red wavelength is transmitted, a green organic substance through which light having a green wavelength is transmitted, and a blue organic substance through which light having a blue wavelength is transmitted, respectively. For example, among the columns of pixels, the nth (n is the natural number) column of pixels may include the red color filter pattern, the n+1th column of pixels may include the green color filter pattern, and the n+2th column of pixels may include the blue color filter pattern.

The first, second, and third color filter patterns 131, 132 and 133 may comprise a photoresistive organic substance, for example, a photoresist. For example, the first, second, and third color filter patterns 131, 132 and 133 may comprise a negative type of photoresist, a portion of which is cured when the photoresist is exposed to light.

The first, second, and third color filter patterns 131, 132 and 133 may be formed to have substantially equal thickness, or different thicknesses.

Spacers 141 are formed on the black matrix 121 to maximize the opening ratio. For example, the spacers 141 may be disposed on the black matrix 121 of the first pixel region 1111 that is provided between the pixels 111. In an exemplary embodiment of the present invention, the spacers 141 are formed on the black matrix 121, which is disposed between the pixels 111 of the first pixel region 1111, and are not provided on the second and the third pixel regions 1112 and 1113.

The spacers 141 may be formed to be higher than the common electrode 150, such that a cell gap between the first substrate 2 and the second substrate 3 is uniformly maintained. The spacers 141 may be formed in various shapes, such as for example, a ball shape or a column shape. In exemplary embodiments of the present invention described in connection with FIGS. 1, 2, 3, 4, 5 and 6A through 6E, the spacers 141 have a column shape.

The spacers 141, which have a column shape, may be formed by patterning a photoresistive organic substance. For example, the spacers 141 may have a truncated cone, cylinder or cross-column shape.

In the case when the spacers 141 have a truncated cone shape, a smear margin may be improved. The term "smear margin" refers to the degree of the restoration after the first substrate 2 and the second substrate 3 are compressed. The smear margin may be improved as the cross-sectional area of the spacer 141 increases. That is, as an area of a section of the spacer 141 that is parallel to the insulating substrate 100 is increased, the smear margin increases. However, as the cross-sectional area of the spacer 141 is increased, a space in which the liquid crystal layer 4 may be interposed between the first substrate 2 and the second substrate 3 is reduced. In an exemplary embodiment of the present invention, an area of a first surface of the spacer 141 is different from that of a second surface of the spacer 141, and a larger space between the first substrate 2 and the second substrate 3, that is, a better liquid crystal margin, may be attained, in comparison with the case when the area of the first and second surfaces of the spacer 141 are the same.

The spacers 141 may be formed by patterning a photoresist, for example, a photoresistive organic substance containing a light blocking material. The photoresist may contain a photopolymerization initiator, a monomer, or a binder.

For example, a triazine-based compound (the general term for three types of hexacyclic compounds which contain three nitrogen atoms and are represented by a molecular formula of $C_3H_3N_3$) that emits radicals when exposed to light and has high sensitivity and stability may be used as the photopolymerization initiator. The monomer is converted into polymers, for example, due to the radicals caused by the photopolymerization initiator after the polymerization reaction is initiated, so as not to be dissolved in the solvent. The binder may enable the monomer liquid to form a film at normal temperature, such that the monomer withstands the photoresist developing solution, the dispersion of the pigment is stabilized, and the spacer 141 has desirable heat resistance, light resistance, and chemical resistance properties. Thus, reliability may be achieved.

The spacer 141 may include the lower spacer 141a and the upper spacer 141b that are formed on the black matrix 121, wherein the lower spacer 141a and the upper spacer 141b may have substantially the same pattern.

The lower spacer 141a may be made of substantially the same substance as the first color filter pattern 131. For example, in the case of when the first color filter pattern 131 is formed of the negative type of red photoresist, the lower spacer 141a is formed of the negative type of red photoresist.

The upper spacer 141b may be formed directly on the lower spacer 141a, for example, to maintain the cell gap between the first substrate and the second substrate 3.

The upper spacer 141b may be formed using a different type of photoresist compared to the first color filter pattern 131, for example, a positive type of photoresist.

The common electrode 150 is formed on the black matrix 121 and the first, second and third color filter patterns 131, 132 and 133. The common electrode 150 is formed to expose the spacer 141 by patterning a portion on which the spacer 141 is formed.

The common electrode 150 has a potential difference with respect to the pixel electrode 82 of the first substrate 2 to control alignment of the liquid crystal molecules of the liquid crystal layer 4, and the liquid crystal display 1 may display color images. The common electrode 150 may comprise a transparent conductor, for example, ITO (Indium Tin Oxide) or IZO (Indium Zinc Oxide), such that light penetrates the common electrode 150 and color images may be displayed.

In the liquid crystal display 1 according to an exemplary embodiment of the present embodiment, the spacer 141 is formed directly on the black matrix 121, the number of process devices and the process time may be reduced, an overcoat layer is not formed, and the thickness of the liquid crystal display 1 may be reduced.

Figure 4:
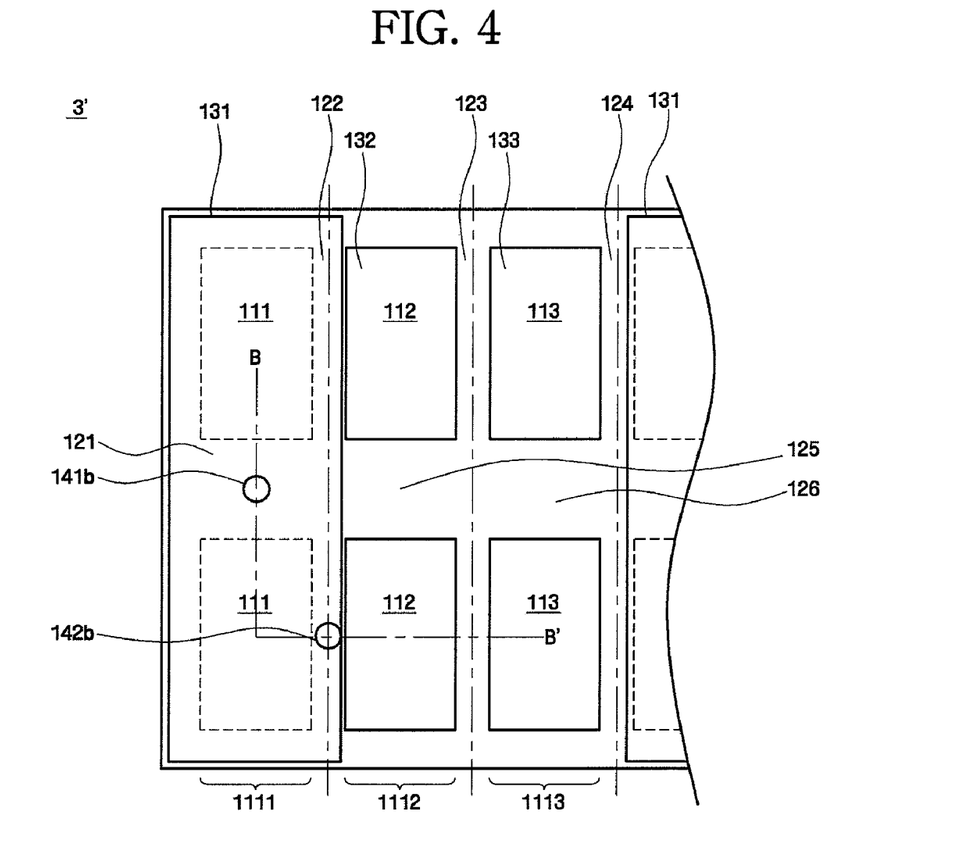
FIG. 4 is a plan view of a portion of a substrate of a liquid crystal display according to an exemplary embodiment of the present invention.
Figure 5:
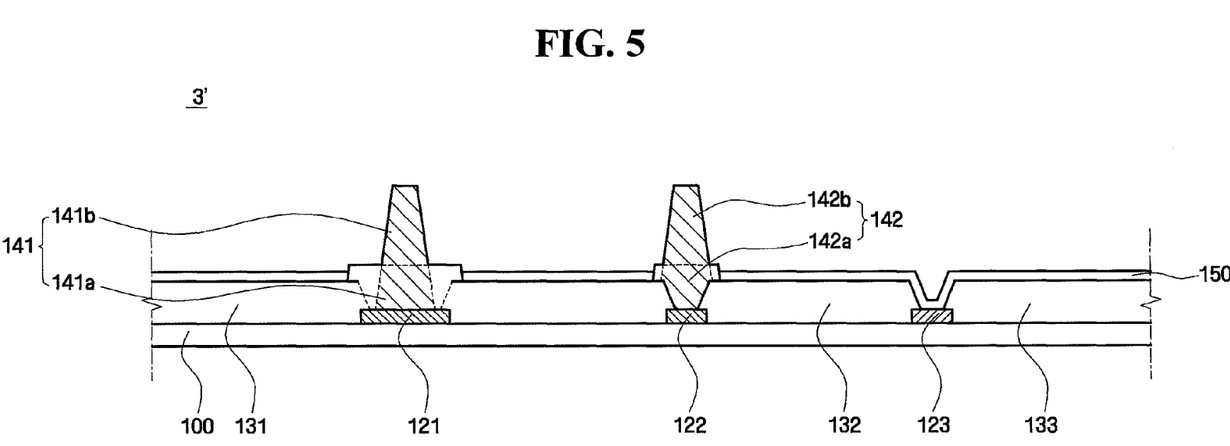
FIG. 5 is a sectional view of the substrate of FIG. 4 taken along the line B-B' in FIG. 4.

Hereinafter, a liquid crystal display according to an exemplary embodiment of the present invention will be described with reference to FIGS. 4 and 5. FIG. 4 is a plan view of a portion of a substrate of a liquid crystal display according to an exemplary embodiment of the present invention. FIG. 5 is a sectional view of the substrate of FIG. 4 taken along the line B-B' in FIG. 4.

In FIG. 4, elements that are the same elements described in connection with FIG. 2 are labeled with the same reference numerals, and further descriptions of these elements will be omitted. Referring to FIG. 4, the liquid crystal display has the same structure as the liquid crystal display 1 according to an exemplary embodiment of the present invention described in connection with FIG. 2, with some exceptions.

With reference to FIGS. 4 and 5, the liquid crystal display includes a second substrate 3' in which a second spacer 142 is formed. The second spacer 142 includes a lower spacer 142a and an upper spacer 142b that are formed on the black matrices 121.

The second spacer 142 may be formed on the black matrix 122 between the first and the second pixel regions 1111 and 1112, or the black matrix 124 between the first and the third pixel regions 1111 and 1113.

Although not shown as such in FIGS. 4 and 5, the second spacer 142 may be formed on the black matrix 123 between the second and the third pixel regions 1112 and 1113. The second spacer 142 may be formed on the black matrix 125 between the second pixels 112, and the black matrix 126 between the third pixels 113. Two or more second spacers 142 may be formed on the black matrices 121, 122, 123, 124, 125 and 126.

The second spacer 142 may be substantially the same as the spacer 141. For example, the lower spacer 142a of the second spacer 142 may comprise the same material as the lower spacer 141a, and the upper spacer 142b may comprise the same material as the upper spacer 141b.

The second spacer 142 may be formed to have a height that is substantially equal to or different from that of the spacer 141.

The spacer 141 and the second spacer 142 may be formed to have the same cross-sectional area. The spacer 141 and the second spacer 142 may have different cross-sectional areas.

In the case when the spacer 141 and the second spacer 142 have the different heights or cross-sectional areas, the smear margin and the liquid crystal margin may compensate for each other.

In the liquid crystal display according to an exemplary embodiment of the present invention, the spacer 141 and the second spacer 142 are formed directly on the black matrix 121, the number of process devices and the process time may be reduced, an overcoat layer is not formed, and the thickness of the liquid crystal display may be reduced.

Hereinafter, a method of producing the liquid crystal display according to an exemplary embodiment of the present invention will be described with reference to FIGS. 1, 3 and 6A through 6E. FIGS. 6A through 6E are sectional views sequentially showing the production of the liquid crystal display according to an exemplary embodiment of the present invention.

First, a method of producing the first substrate 2 according to an exemplary embodiment of the present invention will be described with reference to FIG. 1.

As shown in FIG. 1, a conductive substance such as aluminum, copper, silver, or an alloy thereof is deposited on a transparent substrate 10, and patterned to form a gate electrode 26 and a gate line. The gate electrode 26 and the gate line may be formed as a single layer or as a multilayered structure including two or more layers.

Silicon nitride is deposited on the entire surface of the transparent substrate 10 on which the gate electrode 26 and the gate line (not shown) are formed, thereby forming a gate insulating layer 30. For example, hydrogenated amorphous silicon and n+ hydrogenated amorphous silicon in which an n-type of impurity is doped at a high concentration are sequentially deposited on the gate insulating layer 30 and patterned to form an active layer 40 that comprises the channel portion of the thin film transistor and an n+ hydrogenated amorphous silicon layer (not shown) on the active layer 40.

A conductive layer, such as for example, aluminum, copper, silver, or an alloy thereof, is deposited on the n+ hydrogenated amorphous silicon layer and patterned to form data interconnections. The data interconnections include a data line (not shown), a source electrode 55 connected to the data line, and a drain electrode 56 spaced apart from the source electrode 55 at a predetermined interval.

The n+ hydrogenated amorphous silicon layer that is provided between the source electrode 55 and the drain electrode 56 is removed to complete the production of the ohmic contact layers 45 and 46.

An organic substance that has a planarization property and photoresistivity, a low dielectric insulating substance, or an inorganic substance such as silicon nitride is layered on the ohmic contact layers 45 and 46 and patterned to form a passivation layer 60 having a plurality of contact holes 72.

A transparent conductor, such as ITO (Indium Tin Oxide) or IZO (Indium Zinc Oxide), is layered on the passivation layer 60 and patterned to form a pixel electrode 82 which completes the production of a first substrate 2 of a liquid crystal display according to an exemplary embodiment of the present invention.

Hereinafter, a method of producing the second substrate 3 according to an exemplary embodiment of the present invention will be described with reference to FIGS. 3 and 6A through 6E.

Figure 6A:
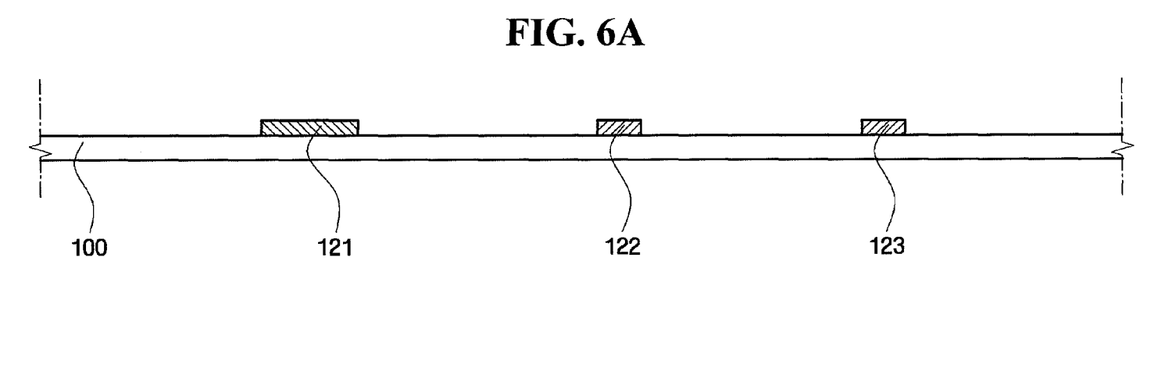
FIGS. 6A through 6E are sectional views sequentially showing the production of a liquid crystal display according to an exemplary embodiment of the present invention.

Referring to FIG. 6A, an opaque substance such as chromium is deposited on the insulating substrate 100 and patterned to form a plurality of black matrices 121, 122 and 123 that define first, second, and third pixel regions, for example, the first, second, and third pixel regions 1111, 1112, and 1113 of FIG. 2.

Figure 6B:
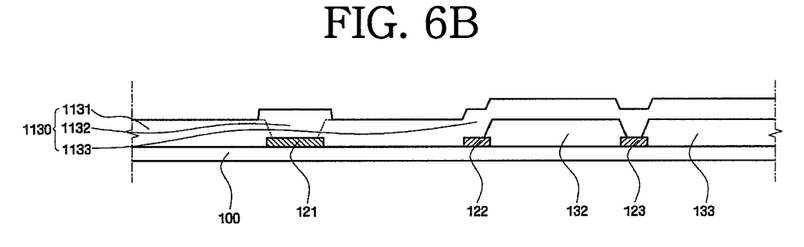

Referring to FIG. 6B, for example, a blue photoresist is applied to the upper sides of the black matrices 121, 122 and 123 and an entire surface of an exposed portion of the insulating substrate 100 on which the black matrices 121, 122 and 123 are not provided to form a blue color filter layer. The color filter layer is exposed and developed to form, for example, the second color filter pattern 132 in a second pixel region, for example, the second pixel region 112 of FIG. 2. The second color filter pattern 132 may be formed to partially overlap the black matrices 122 and 123, which are disposed adjacent to the second color filter pattern 132.

For example, the blue photoresist is applied to the upper sides of the black matrices 121, 122 and 123, the upper side of the second color filter pattern 132, and the entire surface of the exposed portion of the insulating substrate 100 on which the black matrices 121, 122 and 123 are not provided to form the blue color filter layer. The color filter layer is exposed and developed to form, for example, the third color filter pattern 133 in a third pixel region, for example, the third pixel region 113 of FIG. 2. The third color filter pattern 133 may be formed to partially overlap the black matrices (see reference numeral 123 and 124 of FIG. 2), which are disposed adjacent to the third color filter pattern 133.

For example, the red photoresist may be applied to the upper sides of the black matrices 121, 122 and 123, the upper side of the second color filter pattern 132, and the entire surface of the exposed portion of the insulating substrate 100 on which the black matrices 121, 122 and 123 are not provided and patterned to form the color filter layers 1131, 1132 and 1133. In this case, the red photoresist may be, for example, a negative type of red photoresist, and the negative type of red photoresist may be patterned to form the red color filter layer.

In an exemplary embodiment of the present invention, the red color filter layer is used as the color filter layers 1131, 1132, and 1133. However, it is to be understood that the color filter layers 1131, 1132, and 1133 may be formed to have a blue color or a green color.

In an exemplary embodiment of the present invention, after the blue color filter pattern and the green color filter pattern are formed, the color filter layers 1131, 1132 and 1133, for example, the red color filter layer is formed. However, it is to be understood that, before the blue color filter pattern and the green color filter pattern are formed, the color filter layers 1131, 1132 and 1133, for example, the red color filter layer, may be formed on the black matrices 121, 122 and 123, and the exposed portion of the insulating substrate 100 on which the black matrices 121, 122 and 123 are not provided.

Figure 6C:
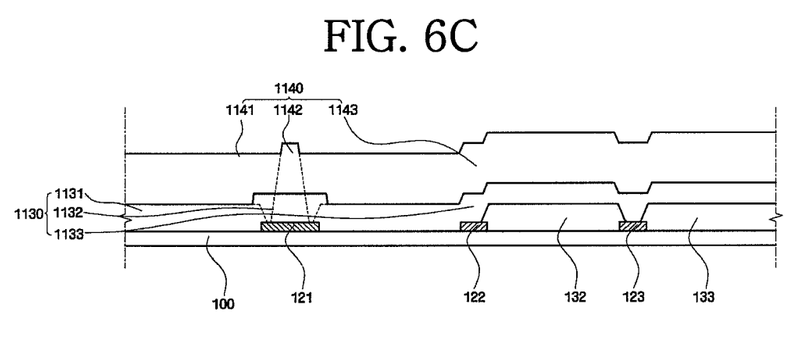

Referring to FIG. 6C, a photoresistive organic substance, for example, a positive type of photoresist, is applied to the color filter layers 1131, 1132 and 1133 to form organic layers 1141, 1142 and 1143 for an upper spacer. The color filter layers 1131, 1132 and 1133 and the organic layers for forming an upper spacer may be formed using different types of photoresists. For example, the color filter layers 1131, 1132 and 1133 may be formed using the negative type of photoresist, and the organic layers 1141, 1142 and 1143 for an upper spacer may be formed using the positive type of photoresist.

The organic layers for forming an upper spacer 1141, 1142 and 1143 may be formed using, for example, lamination or coating methods such as spin coating or slit coating.

Before the organic layers for forming an upper spacer 1141 1142, and 1143 are formed, the color filter layers 1131, 1132 and 1133 which were formed in advance may be subjected to prebaking.

Figure 6D:
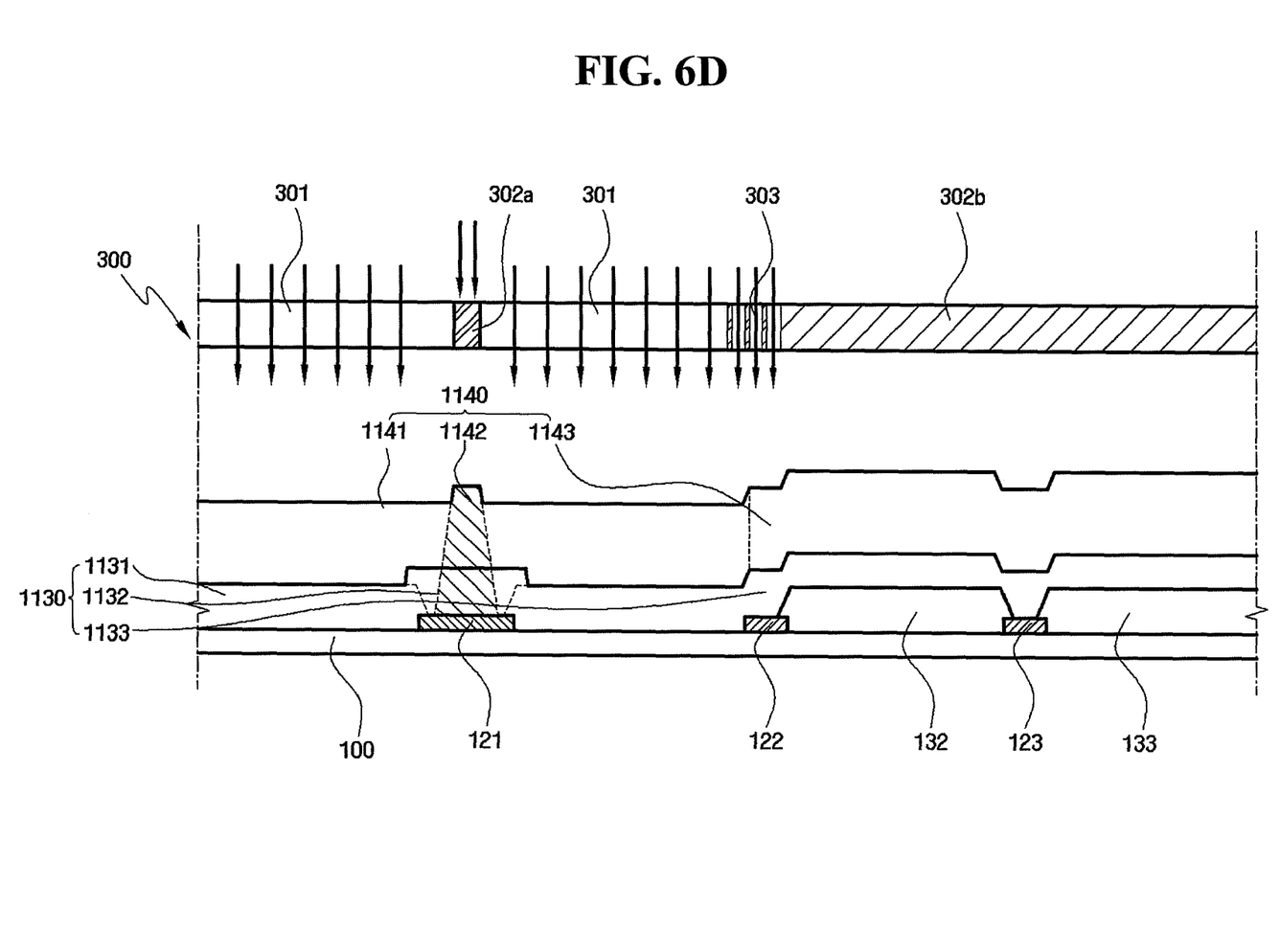

Referring to FIG. 6D, the organic layers for forming an upper spacer 1142 and 1143 and the color filter layers 1131, 1132 and 1133 are substantially simultaneously patterned using mask patterns 302a and 302b and slit mask patterns 303. For example, a process of forming the first color filter pattern 131, the lower spacers 141a, and the upper 141b includes curing a portion of the organic layers for forming an upper spacer 1142 on the black matrices 121, and the organic layer for forming an upper spacer 1143 on the second and third pixel regions, for example, the second and the third pixel regions 112 and 113, and performing lift-off of the color filter layer 1133 and the organic layer for forming an upper spacer 1143 corresponding in position to the second and third pixel regions.

When the organic layers for forming an upper spacer 1141 are formed using the positive type of photoresist, the organic layers for forming an upper spacer 1141 are softened when exposed to light through an opening 301 on the organic layers for forming an upper spacer. However, when the color filter layer 1131 under the organic layers for forming an upper spacer 1141 is formed using the negative type of photoresist, the color filter layer is hardened when exposed to light. Meanwhile, a portion of the color filter layer 1132 not exposed to light due to blocking using the mask patterns 302a and 302b is hardened to form the lower spacer 141a of FIG. 6E.

In this case, since the light is blocked by the mask pattern 302b, the second and third pixel regions are not exposed to light. However, edges of the second and the third pixel regions are partially exposed using the slit mask pattern 303 and then developed. For example, light is radiated on the organic layers for forming an upper spacer 1143 that are the positive type of photoresist to soften the organic layers for forming an upper spacer, and the light is not radiated on the lower color filter layer that is formed using the negative type of photoresist.

Figure 6E:
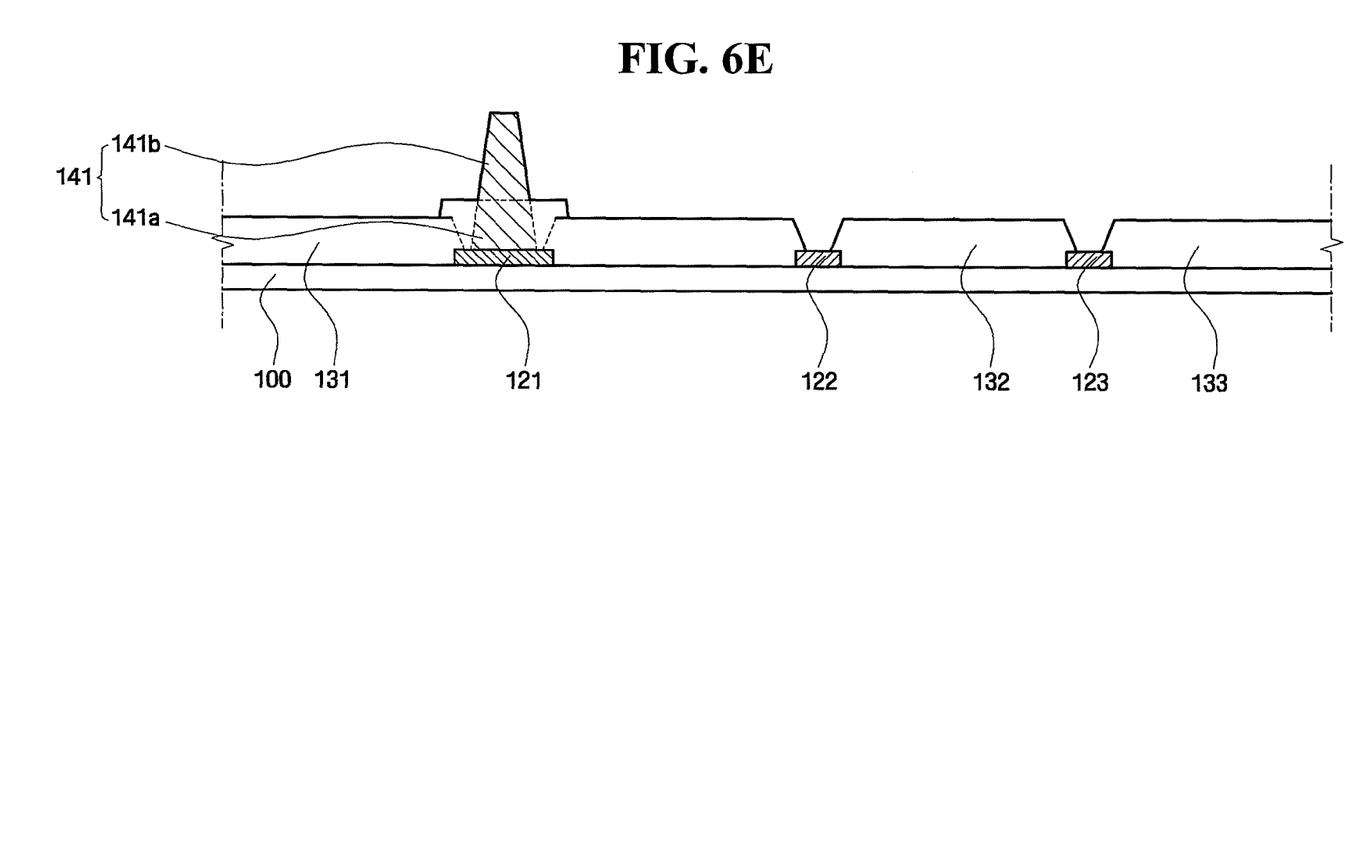

Referring to FIG. 6E, the organic layers for forming an upper spacer 1141 of a first pixel region, for example, the first pixel region 1111 of FIG. 2, the organic layers for forming an upper spacer 1143 at the edges of the second and third pixel regions, and the softened color filter pattern 1133 that is provided under the organic layers for forming an upper spacer are removed by a developing solution. An opening (not shown) is formed in a portion of the organic layers for forming an upper spacer 1143, that is, the organic layers for forming an upper spacer 1143 provided under the slit mask pattern (see reference numeral 303 of FIG. 6D), due to light that penetrates the slit mask pattern (see reference numeral 303 of FIG. 6D). The developing solution is introduced through the opening to perform lift-off of the organic layers for forming an upper spacer 1143 on the second and third pixel regions and the color filter layer 1133 provided under the organic layers for forming an upper spacer 1143. That is, since the second and third pixel regions are softened, the second and the third pixel regions are removed using the injected developing solution. Accordingly, the organic layers for forming an upper spacer 1143 are removed on the second and the third pixel regions.

Due to the above-mentioned exposure and development processes, the lower spacer 141a in which the color filter layer (see reference numeral 1132 of FIG. 6D) is cured, and the upper spacer 141b in which the organic layers for forming an upper spacer (see reference numeral 1142 of FIG. 6D) are cured are simultaneously formed on the first color filter pattern 131 and the black matrix 121.

Referring to FIG. 3, after the first color filter pattern 131, the lower spacer 141a, and the upper spacer 141b are formed, the common electrode 150 is formed on the black matrices 121, 122 and 123, the first color filter pattern 131, the second color filter pattern 132, and the third color filter pattern 133 to expose the upper spacer 141b, which completes the production of the second substrate 3 according to an exemplary embodiment of the present invention.

Referring to FIG. 1, after the first substrate 2 and the second substrate 3 are aligned and the liquid crystal layer 4 is formed between the first substrate 2 and the second substrate 3, sealing is performed such that the spacer 141 that is formed in the second substrate 3 overlaps the gate line of the first substrate 2, the gate electrode 26 and/or data interconnections, for example, the thin film transistor. Elements such as a polarizing plate, a back light, and a compensation plate may be provided on a structure of the liquid crystal display 1 to complete the production of the liquid crystal display 1 according to an exemplary embodiment of the present invention.

In the method of producing a liquid crystal display according to an exemplary present embodiment, the first color filter pattern 131 and the spacer 141 are substantially simultaneously formed using the single exposing process and the single developing process, and the process time and the number of process devices during the production of the liquid crystal display may be reduced.

Hereinafter, a method of producing the liquid crystal display according to an exemplary embodiment of the present invention will be described with reference to FIGS. 4, 5 and 6A through 6E. As shown in FIG. 4, the method of producing a liquid crystal display according to an exemplary embodiment of the present embodiment includes at least substantially simultaneously forming the spacer 141, the first color filter pattern 131 and the second spacer 142.

With reference to FIG. 4, a process of producing a first substrate, for example, the first substrate 2 of FIG. 1, may be the same as the process of producing the second substrate 3', with the exception that the positions of the spacer 141 and the second spacer 142 are changed.

Referring to FIGS. 6A through 6E, the black matrices 121, 122 and 123, the second and third color filter patterns 132 and 133, the color filter layers 1131, 1132 and 1133, and the organic layers for forming an upper spacer 1141, 1142 and 1143 are formed on the insulating substrate 10.

Referring to FIGS. 5 and 6A through 6E, the color filter layer 1133 and the organic layers for forming an upper spacer 1143 are at least substantially simultaneously patterned to form the first color filter pattern 131 on a first pixel region, for example, (the first pixel region 1111 of FIG. 4, and to form the spacer 141 and the second spacer 142 on two or more points of the black matrices 121 and 122. That is, the first color filter pattern 131, the lower spacer 141a, the second lower spacer 142a, and the upper spacer 141b and the second upper spacer 142b that are provided on the lower spacer and the second lower spacer are at least substantially simultaneously formed.

The spacer 141 and the second spacer 142 according to an exemplary embodiment of the present embodiment are simultaneously formed on the black matrix 121 between the pixels 111 which comprise a first pixel region, for example, the first pixel region 1111 of FIG. 4, the black matrix 122 between first and second pixel regions, for example, the first and second pixel regions 1111 and 1112 of FIG. 4, or the black matrix 124 between first and third pixel regions, for example, first and third pixel regions 1111 and 1113 of FIG. 4.

In the method of producing the liquid crystal display according to an exemplary embodiment of the present embodiment, the spacer 141, the second spacer 142 and the first color filter pattern 131 are at least substantially simultaneously formed at different positions, and the process time and the number of process devices may be reduced.

In an exemplary embodiment of the present invention, a spacer and a first color filter pattern are at least substantially simultaneously formed, and a process time and the number of process devices may be reduced.

In an exemplary embodiment of the present invention, a spacer is formed directly on the black matrix, and the thickness of the liquid crystal display may be reduced.

In an exemplary embodiment of the present invention, a plurality of spacers is provided, and a smear margin and a liquid crystal margin may be improved.

Although exemplary embodiments of the present invention have been described in detail with reference to the accompanying drawings for the purpose of illustration, it is to be understood that the inventive processes and apparatus should not be construed as limited thereby. It will be apparent to those of ordinary skill in the art that various modifications to the foregoing exemplary embodiments can be made without departing from the scope of the invention as defined by the appended claims, with equivalents of the claims to be included therein.

What is claimed is:

1. A method of producing a liquid crystal display, the method comprising:
   forming a plurality of black matrices on an insulating substrate to define first, second and third pixel regions;
   forming a color filter layer on the black matrices and on an exposed portion of the insulating substrate on which the black matrices are not formed;
   forming an organic layer for forming an upper spacer on the color filter layer; and
   forming a first color filter pattern on the first pixel region, lower spacers on the black matrices, and upper spacers on the lower spacers by at least substantially simultaneously patterning the color filter layer and the organic layer for forming an upper spacer.

2. The method of claim 1, wherein the color filter layer and the organic layer for forming an upper spacer are formed using different types of photoresists.

3. The method of claim 2, wherein the color filter layer and the lower spacers are formed using a negative type of photoresist, and wherein the upper spacers are formed using a positive type of photoresist.

4. The method of claim 2, wherein forming the first color filter pattern, the lower spacers and the upper spacers comprises:
   curing a portion of the organic layer for forming an upper spacer on the black matrices, and a portion of the organic layer for forming an upper spacer on the second and third pixel regions; and
   performing lift-off of the color filter layer and the organic layer for forming an upper spacer corresponding in position to the second and third pixel regions.

5. The method of claim 4, wherein curing the organic layer for forming an upper spacer comprises partially exposing the organic layer for forming an upper spacer which is formed on the black matrices between the first and second pixel regions or between the first and third pixel regions.

6. The method of claim 1, further comprising:
   forming a common electrode on the black matrices and the first color filter pattern to expose the upper spacers, after forming the first color filter pattern, the lower spacers and the upper spacers.

7. The method of claim 1, wherein the first, second and third pixel regions comprise columns of pixels sequentially arranged, and wherein the lower and upper spacers are disposed on the black matrices between the pixels comprising the first pixel region.

8. The method of claim 7, wherein the lower spacer and the upper spacer are at least substantially simultaneously formed on the black matrix between the pixels comprising the first pixel region and at least one of the black matrix between the first and the second pixel regions or the black matrix between the first and the third pixel regions.

9. The method of claim 7, further comprising:
   forming a second color filter pattern and a third color filter pattern on the second pixel region and the third pixel region, respectively, before the color filter layer is formed.

10. The method of claim 1, further comprising:
    prebaking the color filter layer before the organic layer for forming an upper spacer is formed.

11. The method of claim 1, wherein the organic layer for forming an upper spacer is formed using lamination or a coating method.

12. A liquid crystal display comprising:
    an insulating substrate;
    a plurality of black matrices formed on the insulating substrate to define first, second and third pixel regions;
    first, second and third color filter patterns formed on the first, second and third pixel regions, respectively; and
    spacers provided on the black matrices, the spacers including a lower spacer made of substantially the same substance as a first color filter pattern and an upper spacer formed directly on the lower spacer, wherein the first, second and third pixel regions comprise columns of pixels sequentially arranged, and wherein the spacers are disposed on the black matrices between the pixels comprising the first pixel region.

13. The liquid crystal display of claim 12, wherein the first color filter pattern and the upper spacer are formed using different types of photoresists.

14. The liquid crystal display of claim 13, wherein the first color filter pattern is formed using a negative type of photoresist, and wherein the upper spacer is formed using a positive type of photoresist.

15. The liquid crystal display of claim 12, further comprising:
 a second spacer formed on the black matrix between the first and the second pixel regions or between the first and the third pixel regions.

16. The liquid crystal display of claim 12, wherein the upper spacer and the lower spacer have substantially the same pattern.

17. The liquid crystal display of claim 12, wherein the spacers have a truncated cone shape, a cylinder shape or a cross-column shape.

18. The liquid crystal display of claim 12, further comprising:
 a common electrode formed on the black matrices and the first, second and third color filter patterns to expose the spacers.

* * * * *